(12) United States Patent
Suotula et al.

(10) Patent No.: US 7,450,565 B2
(45) Date of Patent: Nov. 11, 2008

(54) CONVERSATIONAL BEARER NEGOTIATION

(75) Inventors: Janne Suotula, Espoo (FI);
Miguel-Angel Garcia-Martin, Helsinki (FI); Keijo Laiho, Masala (FI); Gonzalo Camarillo, Helsinki (FI); Nils Karlsson, Bobäck (FI)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 31 days.

(21) Appl. No.: 10/595,002

(22) PCT Filed: Jun. 16, 2004

(86) PCT No.: PCT/EP2004/051139

§ 371 (c)(1),
(2), (4) Date: Jun. 19, 2006

(87) PCT Pub. No.: WO2004/112415

PCT Pub. Date: Dec. 23, 2004

(65) Prior Publication Data

US 2007/0053343 A1    Mar. 8, 2007

(30) Foreign Application Priority Data

Jun. 19, 2003    (GB) .................................. 0314252.8

(51) Int. Cl.
*H04L 12/66*    (2006.01)

(52) U.S. Cl. ......................... 370/352; 370/354; 370/356

(58) Field of Classification Search .................. 370/352, 370/354, 356
See application file for complete search history.

(56) References Cited

U.S. PATENT DOCUMENTS

| | | | |
|---|---|---|---|
| 2002/0110104 A1* | 8/2002 | Surdila et al. ................ | 370/338 |
| 2003/0027569 A1* | 2/2003 | Ejzak .......................... | 455/432 |
| 2003/0050051 A1 | 3/2003 | Vilander | |
| 2004/0008669 A1* | 1/2004 | Bos et al. ..................... | 370/352 |
| 2004/0190498 A1* | 9/2004 | Kallio et al. ................. | 370/352 |
| 2004/0190689 A1* | 9/2004 | Benitez Pelaez et al. . | 379/88.13 |

FOREIGN PATENT DOCUMENTS

| | | |
|---|---|---|
| EP | 1 317 108 A | 6/2003 |
| EP | 1317108 | 6/2003 |
| WO | WO 03/001836 | 1/2003 |
| WO | WO 03/001836 A | 1/2003 |

* cited by examiner

*Primary Examiner*—Quynh H Nguyen

(57) ABSTRACT

A method of setting up a call between first and second nodes of a communication system when the call extends across a circuit switched access network and a packet switched backbone network interconnected by a Media Gateway. A control node obtains from a Home Subscriber Server, the identity of a Media Gateway Control Function controlling that Media Gateway which will terminate the call within the circuit switched access network. The first node calls an access number notified to it by the Media Gateway Control Function, and as part of the call setup procedure, the identity of the Media Gateway selected to terminate the call is communicated to the second node.

20 Claims, 5 Drawing Sheets

CONVERSATIONAL BEARER NEGOTIATION

FIELD OF THE INVENTION

The present invention relates to negotiating the setting up of circuit-switched conversational bearers in communication networks, which bearers can be used, for example, to carry real time voice and video information.

BACKGROUND OF THE INVENTION

Digital cellular telephone networks have traditionally relied upon circuit switched channels to carry user traffic such as voice communications A circuit switched channel is formed by the allocation of one slot per frame in a given TDMA channel. Whilst circuit switched sessions have proved adequate for voice calls, they do not provide an efficient mechanism for transferring large amounts of data which is "bursty" in nature. For example, the setting up of a circuit switched session to download a web page from a web server is likely to result in the connection remaining idle for significant amounts of time, and being overloaded when there is data to transmit.

To facilitate fast data transfers to mobile terminals, packet switched data services are being introduced to digital cellular telephone networks. For example, the General Packet Radio Service (GPRS) is currently being introduced to many GSM networks. Unlike circuit switched calls, a GPRS session (referred to as a PDP context) for a given user does not necessarily occupy one slot per frame on a given TDMA channel. Rather, slots are only used when the user has data to send or receive. When there is no traffic to transmit, no slots are allocated to the user. When there is a large volume of data to transmit, the user may be allocated one or more slots per frame.

GPRS will be available in future third generation networks such as 3G networks which will rely upon CDMA rather than TDMA. 3G networks will however continue to provide circuit switched services at least for the foreseeable future, although these sessions will not necessarily be end to end. Rather, the links between mobile terminals and the networks will be circuit switched, with data being routed within and between networks via high capacity packet switched networks (which have sufficient bandwidth to handle real time traffic).

It is envisaged that in the future, the packet switched (access) domain will be able to carry real time information streams, for example relating to voice and video telephony. However, at present the transmission reliability of GPRS is not sufficient to provide users with telephony services of the quality which they will expect, hence the continued provision of circuit switched services (the provision of circuit switched services is also likely to be necessary by the need to continue to service older mobile terminal equipment which is not GPRS enabled).

To facilitate the provision of multimedia services via the packet switched "domain", the $3^{rd}$ Generation Partnership project (3GPP) responsible for the 3G standards has been developing a so-called IP Multimedia Core Network Subsystem (IMS). IMS communicates with the GPRS core network and contains all elements that are used to provide IP based multimedia services. The base protocol for multimedia services is the IETF Session Initiation Protocol (SIP). SIP makes it possible for a calling party to establish a packet switched session to a called party (using so-called SIP User Agents, UAs, installed in the user terminals) even though the calling party does not know the current IP address of the called party prior to initiating the call. SIP provides other functionality including the negotiation of session parameters (e.g. Quality of Service and codecs).

FIG. 1 illustrates schematically a 3G network providing circuit switched (CS) and packet switched (PS) access networks to a mobile terminal. The figure illustrates a call being made by the mobile terminal, via its circuit switched access network, to a PC which has access only to a packet switched network. The session is initiated by the dialling of a telephone number from the mobile terminal, i.e. this does not involve any exchange of SIP signalling between the home network and the mobile terminal, and SIP URLs cannot be transferred over the CS domain. The destination terminal must have allocated to it a standard telephone number in order for such a session to be established. Translation between circuit switched and packet switched data is performed by an interworking gateway (GW), with the GW establishing the packet switched session to the PC using SIP signalling. Assuming that the packet switched network used by the PC has sufficient bandwidth (e.g. the network is a broadband network), the call will provide the users with a sufficient level of quality for voice and video. In this scenario, the IMS of the home operator's network is not used.

In addition to the need for the destination terminal to have allocated to it a telephone number, a further disadvantage of the architecture of FIG. 1 is that the destination terminal will not necessarily know that a conversational bearer has been established using a CS access network. Any attempt by the destination terminal to establish some additional (non-conversational) PS bearer will fail, because the gateway cannot provide this service. Also, any attempt by the initiating terminal to establish a (non-conversational) PS bearer may fail because the destination terminal will not be able to associate the set-up request with the existing conversational bearer.

FIG. 2 illustrates an alternative scenario in which a call between the mobile terminal and the PC is established using the PS access network available to the mobile terminal. The call is established using a SIP server of the IMS. Due to the limited bandwidth of the PS access network available to the mobile terminal, the session is unlikely to be of sufficient quality to handle real time voice and video data. A separate CS bearer should be established for this purpose. However, this might not be straightforward given that the initiating or terminating terminal might know only the SIP URL of the peer terminal, and not its telephone number.

It is likely that users will prefer to initiate and receive circuit switched and packet switched calls using a common signalling interface. However, under the current proposals, a user would initiate and receive a packet switched call using SIP, e.g. to initiate a packet switched call the user would enter the SIP address for the called party (e.g. john@example.org), whilst he/she would initiate and receive a circuit switched call using the DTAP protocol, e.g. to initiate such a call the user would dial the called party's telephone number (e.g. 012345 . . . ). Network operators would also prefer to use a common signalling interface as this will ease the migration of circuit switched services to the packet switched domain, when that domain has evolved sufficiently to provide the required services.

SUMMARY OF THE INVENTION

According to a first aspect of the present invention there is provided a method of setting up a call between first and second nodes of a communication system, said call extending across at least one circuit switched access network and a packet switched backbone network, the networks being interconnected by at least one Media Gateway, the method comprising:

1) sending a call initiation message from the first node to the second node via a control node over a packet switched access network available to the first node; and
2) at the control node, obtaining from a Home Subscriber System the identity of a Media Gateway Control Function controlling that Media Gateway which will terminate the call within the circuit switched access network.

Preferably, the method comprises the further steps of:

3) sending from the control node to the first node over the packet switched access network, a circuit switched access number associated with the identified Media Gateway Control Function;
4) calling said access number from the first node, and as part of the call set-up procedure communicating the identity of the Media Gateway selected to terminate the call to the Media Gateway Control Function;
5) terminating the circuit switched call at the selected Media Gateway; and
6) sending an update message from the first node to the second node over the packet switched access network, the Media Gateway Control Function incorporating into the update message an IP address of said selected Media Gateway.

In a typical scenario, the protocol used to set-up the session is SIP and said control node is a Serving Call State Control Function (S-CSCF) node located within the IP Multimedia Subsystem (IMS). Said call initiation message is a SIP INVITE message which is sent from the Serving Call State Control Function node to said second node via the Media Gateway Control Function, following identification of the Media Gateway Control Function by the Serving Call State Control Function. Preferably, the update message being a SIP UPDATE message.

The step of signalling an access number to said first node may comprise, following receipt of the call initiation message at the Media Gateway Control Function, sending from the Media Gateway Control Function to said first node, via the Serving Call State Control Function, a SIP REFER message containing the access number. Preferably, the step of calling said access number from the first node being is carried out automatically at the first node following receipt at that node of the SIP REFER message.

Typically, both the first and second nodes are attached to respective circuit switched and packet switched access networks, the method comprising carrying out steps 2) to 5) to establish a circuit switched call at the terminating side between the second node and a Media Gateway selected for that node, and carrying out step 6) to signal to the initiating side the IP address of that Media Gateway. In an alternative architecture, said second node has access to only a packet switched access network, and said Media Gateway exchanges packets directly with the second node.

It is anticipated that one or both of the first and second nodes are user terminals. One of the terminals may be server such as a web server.

Preferably, said step of identifying a Media Gateway Control Function at the control node comprises receiving from a Home Subscriber System either the identity of the switch to which the first node is currently attached or the identity of the Media Gateway Control Function. The identity information may be sent by the Home Subscriber Server automatically following SIP registration of the first node.

Preferably, the communications system is a cellular radio communications system, and the identity of the Media Gateway Control Function is received at the S-CSCF in response to a query sent to the Home Subscriber Sever by the control node, the query being triggered by receipt of the call initiation message. More preferably, the Home Subscriber Server receives Mobile Switching Centre location data for subscribers from a Home Location Register.

Preferably, the setting up of the call to the Media Gateway is controlled by a Mobile Switching Centre, the Mobile Switching Centre sending an Initial Address Message to the Media Gateway Control Function and that message containing the identity of the selected Media Gateway.

According to a second aspect of the present invention there is provided a method of operating a Serving Call State Control Function of an IP Multimedia Subsystem, the method comprising:

receiving a SIP INVITE message from a client terminal over a packet switched access network, the INVITE being identified as requiring the setting up of a circuit switched call from the client terminal;
sending a query to a Home Subscriber Server in order to identify a Media Gateway Control Function which controls that Media Gateway which will be selected to terminate the circuit switched call; and
relaying a SIP message from the Media Gateway Control Function to the client terminal, the SIP message containing a number associated with the Media Gateway Control Function and to which the client terminal should call to set up the circuit switched call.

According to a third aspect of the present invention there is provided a method of operating a Media Gateway Control Function arranged in use to control a Media Gateway which provides a user plane interface between a circuit switched network and a packet switched backbone network, the method comprising:

receiving a SIP INVITE message from a client terminal via a Serving Call State Control Function of an IP Multimedia Subsystem;
in response to receipt of said message, selecting a call back telephone number from a pool of numbers allocated to the Media Gateway Control Function;
sending the selected number to the client terminal in a SIP REFER message; and
answering a subsequent call from the client terminal to the selected number including receiving the identity of the Media Gateway which will terminate the call as part of the call set-up procedure.

DETAILED DESCRIPTION OF CERTAIN EMBODIMENTS

Figure 1:
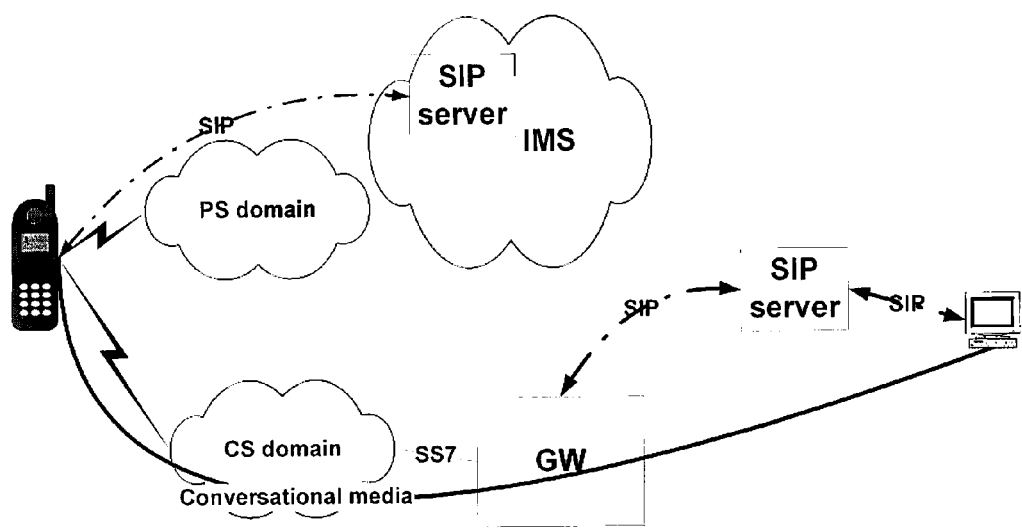
FIG. 1 illustrates a session established between two peer nodes of a telecommunications system over circuit switched and packet switched access networks.
Figure 2:
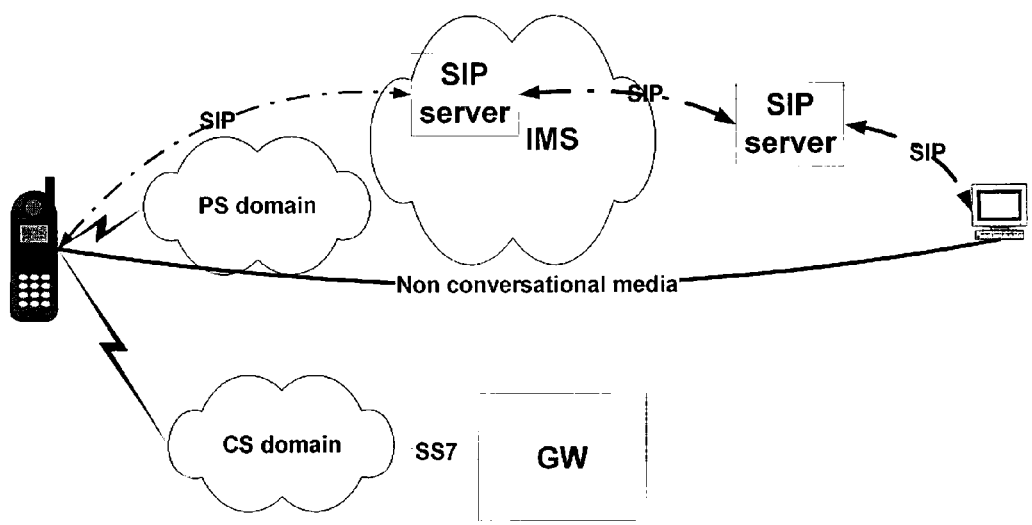
FIG. 2 illustrates a session established between two peer nodes of a telecommunications system over respective packet switched access networks.

Typical call session scenarios in existing and proposed telecommunication networks have been described above with reference to FIGS. 1 and 2.

Figure 3:
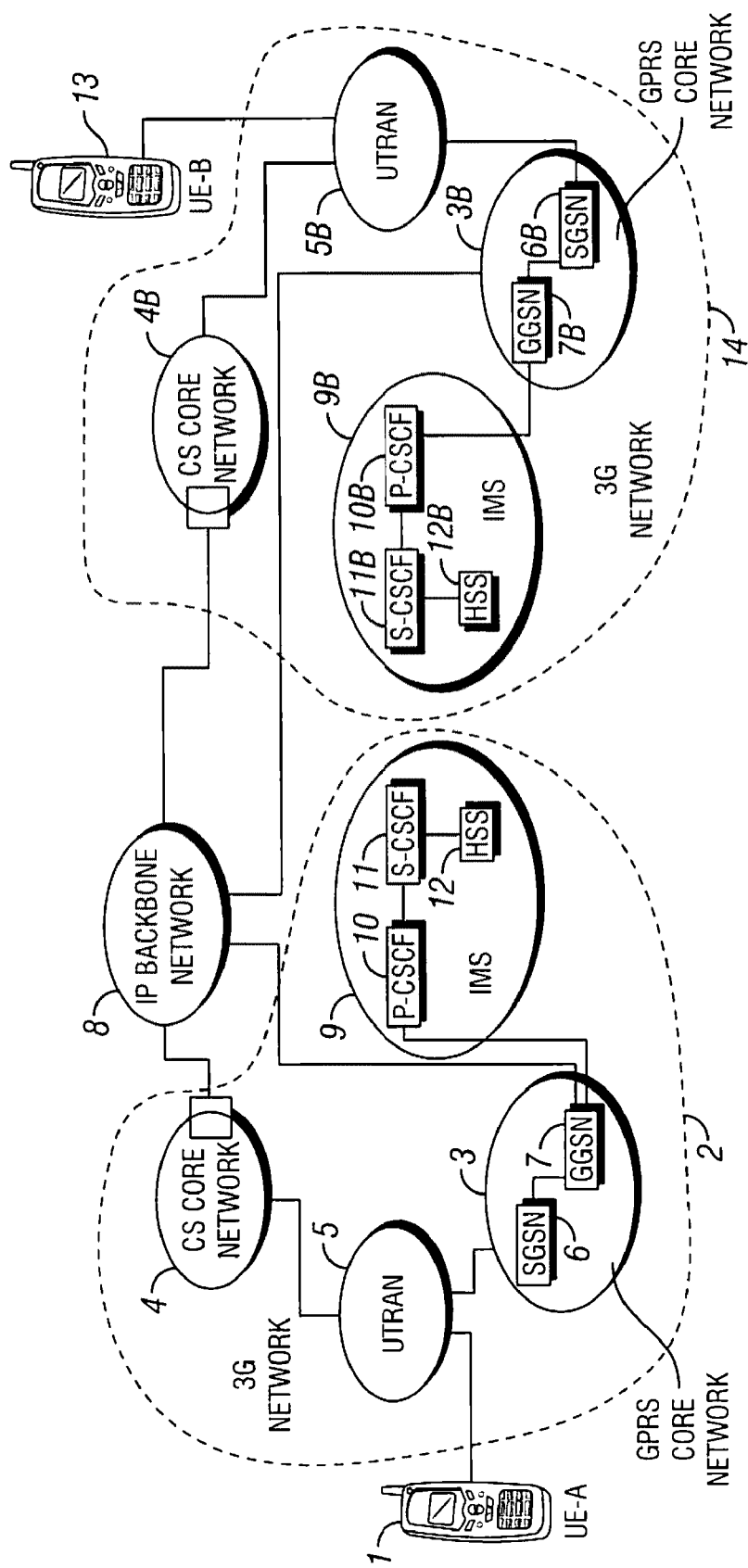
FIG. 3 illustrates an architecture for allowing a packet switched session to be established between peer mobile terminals using SIP in accordance with the present invention.

FIG. 3 illustrates schematically a typical scenario where the user of a mobile terminal or "User Equipment" (UE-A) 1 is a subscriber of a 3G cellular telephone network 2 (the subscriber's home network). The UE-A 1 is a dual mode terminal, e.g. as specified in 3GPP Release 5 (dual CS-IMS/PS). The subscriber using the UE-A is identified in the home network 2 by a unique subscriber identity (e.g. International Mobile Subscriber Identity, IMSI), and the network is referred to as the subscriber's "home" network. The home network comprises a General Packet Radio Service (GPRS) core network 3 and a circuit switched core network 4. Both the core networks 3,4 make use of a common UMTS Radio Access Network (UTRAN) 5. In addition to or as an alternative to the UTRAN, a UE may communicate with the core networks via a GERAN (GSM/EDGE Radio Access Network).

Within the GPRS network 3, two nodes relevant to the UE-A 1 can be identified. These are the Serving GPRS Support node (SGSN) 6 and the Gateway GPRS Support Node (GGSN) 7. The role of the SGSN 6 is to maintain subscription data—identities and addresses—and to track the location of the UE-A 1 within the network. The role of the GGSN 7 is to maintain subscription information and allocated IP addresses and to track the SGSN to which the UE-A 1 is attached. The GGSN 7 is coupled to an IP backbone network 8 (the SGSN is also coupled to the IP network 8, although this session is not shown in the Figure—communication between nodes of the GPRS network, including the GGSN and the SGSN, and between gateway nodes of the UTRAN and the GPRS network, will take place via the IP network 8). Typically, when the UE-A 1 is turned on it "attaches" itself to the GGSN and a PDP context is established between the UE-A 1 and the GGSN 7. This context provides a "pipe" for transporting data from the UE-A 1 to the GGSN 7. This process involves the allocation of an IP address to the UE-A 1. Typically, the routing prefix part of the address is a routing prefix allocated to and uniquely identifying the GGSN 7.

Also illustrated in FIG. 3 is an IP Multimedia Core Network Subsystem (IMS) 9 which contains all of the elements required to provide IP based multimedia services in the packet switched domain, and which communicates with mobile terminals. The functionality provided by the IMS 9 is set out by 3GPP. The IMS 9 consists of a set of nodes which communicate between themselves and with nodes outside of the IMS via the IP backbone network 8 (these sessions are not shown in the Figure). Illustrated within the IMS 9 are a proxy call state control function (P-CSCF) node 10 and a serving call state control function (S-CSCF) node 11. It is assumed here that the IMS is owned by the operator of the home network 2 (although this need not be the case). In the case of a roaming subscriber, the UTRAN and core networks will of course belong to a "visited" network. The P-CSCF will also belong to the visited network, whilst the S-CSCF and the HSS (Home Subscriber Server) will be located in the home network. A subscriber is identified within the IMS by an IMPI (IP multimedia private identity) which has a unique relation with the IMS subscription.

The S-CSCF 11 performs the session control services for the UE, and maintains a session state as needed by the home network operator for support of services. The main function performed by the S-CSCF 11 during a session is the routing of incoming and outgoing call set-up requests. The main function performed by the P-CSCF 10 is to route SIP messages between the UE-A 1 and the IMS 9 of the home network 2.

Following GPRS attach by the UE-A 1, the UE-A must "discover" the identity (i.e. IP address) of the P-CSCF which it should use. This is done using one of the following mechanisms:

1. Use of DHCP to provide the UE-A with the domain name of a Proxy-CSCF and the address of a Domain Name Server (DNS) that is capable of resolving the Proxy-CSCF name.
2. Transfer of a Proxy-CSCF address within the PDP Context Activation signalling to the UE-A (this second alternative is used for terminals not supporting DHCP).

The UE-A 1 will then notify the S-CSCF 11 of its current location, i.e. the IP address allocated by the GGSN, via the P-CSCF 10 (this process requires authentication of the UE 1 to the S-CSCF and vice versa and makes use of the unique subscriber identity). The S-CSCF 11 makes this information available to a Home Subscriber Server 12 which is used to route subsequent incoming calls to the UE-A 1.

Illustrated in FIG. 3 is a UE-B 13 belonging to a subscriber referred to below as the B-subscriber. The UE-B 13 is attached to its own home network 14. This network 14 mirrors the home network 2 used by the UE-A 1, and like numerals, suffixed with a "b", are used to identify components of the network 14. The following discussion assumes that the UE-A 1 or "A-subscriber" wishes to establish a multimedia call to the UE-B 13 or "B-subscriber" using the packet switched domain. The UE 1 first sends a SIP INVITE message to the P-CSCF node 10. The INVITE message contains a SIP address of the UE-B 13 (e.g. john@example.org) as well as an identification of the service required. The P-CSCF node 10 forwards the INVITE message to the S-CSCF node 11.

The S-CSCF 11 verifies the rights of the UE-A 1 (or rather the subscriber using the UE-A 1) to use the requested service which is identified in the INVITE message. The S-CSCF 11 must then identify the IP address of the UF-B 13. It does this by using a look-up table mapping SIP addresses to IP addresses. For a given SIP address, the table provides the IP address of the "home" network of the corresponding subscriber. The identified IP address is used to forward the INVITE message to the S-CSCF 11b in the B-subscriber's home IMS network 9b. Using the SIP address contained in the INVITE message, the S-CSCF 11b identifies the current IP address of the UE-B 13, and forwards the INVITE message to that address. Upon receipt of the INVITE message, and assuming that the UE-B 13 answers the call, an OK message is returned to the UE-A 1. Typically this message is sent via the two S-CSCFs 11,11b. In order to confirm that the OK message is correctly received by the UE-A 1, that UE will upon receipt of the message return an ACK message to the peer UE-B 13. If UE-B 13 does not receive an ACK message within some predefined time period, it will retransmit the OK message.

As well as its use in establishing PS sessions between mobile terminals, SIP may also be used to establish PS sessions between mobile and fixed terminals and between only fixed terminals. For example, SIP may be used to establish a PS session between a mobile subscriber and a fixed terminal which has a broadband session to the Internet.

As mentioned above, the quality of the packet switched "links" between the UEs 1,13 and the respective UTRANs may be such that these links are not suitable for transporting real time conversational data, such as voice and video data associated with a call, between the two peer UEs or between one of the UEs and a fixed terminal. Thus, it may be necessary to establish a circuit switched call between the or each UE 1, 13 and its circuit switched core network 4, 4b.

Figure 4:
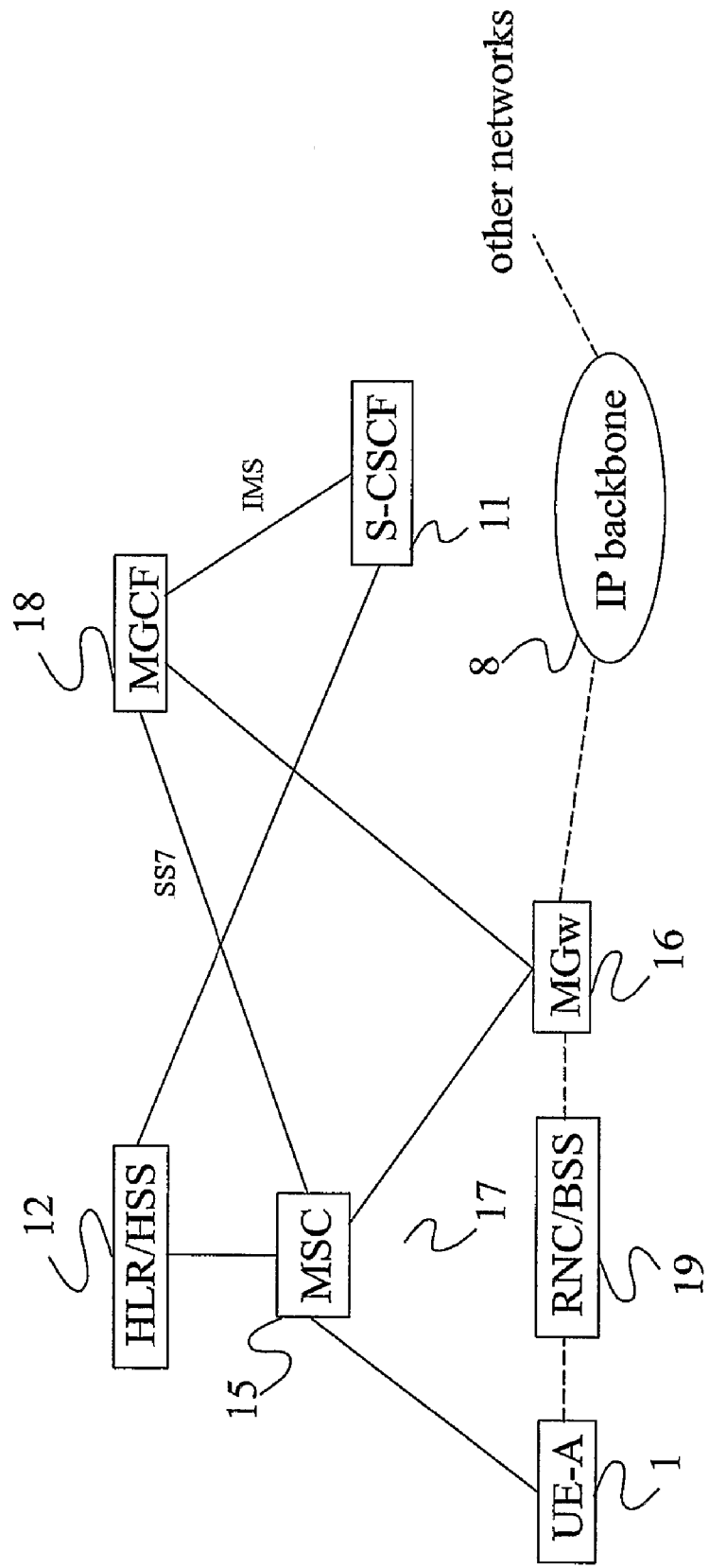
FIG. 4, illustrates certain function components involved in establishing a circuit-switched call between two user terminals, according to an embodiment of the present invention.

FIG. 4 illustrates a number of functional components involved in the CS call set up procedure to be described. This considers only the initiating side of the network, but it will be appreciated that the terminating side is analogous. In the Figure, signalling links are shown with solid lines and voice information links are shown with dashed lines. The UE-A 1 is attached to an MSC 15 of the access network. The MSC controls the setting up of circuit switched links between the UE-A 1 and a Media Gateway (MGw) 16 via a Base Station Subsystem (BSS) or Radio Network Controller 19. The MGw 16 provides interworking between the circuit switched side and the IP side comprising the IP backbone network 8.

The MSC 15 implements functionality for controlling the MGw 16 via an appropriate interface (H.248). The MGw has a further control interface to a Media Gateway Control Function (MGCF) 18, the MGCF providing an interface between the traditional SS7 signalling network (to which the MSC is coupled) and the IMS 9. SIP signalling is exchanged between the MGCF 18 and the S-CSCF 11. Both the S-CSCF 11 and the MSC 15 have interfaces to the HLR/HSS 12. For the sake of simplicity, FIG. 4 does not show the connections between the UE-A and the S-CSCF via the PS network and the IMS. Whilst the MGCF and the MSC are shown in FIG. 4 as separate entities, in practice these may be collocated. Conversely, whilst the HLR and HSS are shown collocated, these may be implemented as separate entities.

The UEs are assumed to have an ongoing PS domain session to the IMSs of their respective home networks, and the UEs are registered with the respective IMS domains. Considering UE-A, the SIP User Agent (UA) running at the UE has already informed its IMS SIP server (which will typically be the S-CSCF of the home network, but could be a P-CSCF of a visited network), e.g. during registration, that conversational bearers should not be established over the PS domain, and that the SIP UA will use the CS domain for such bearers (this requirement may be a default setting for the UE-A). The PS domain and the SIP server are, nonetheless, used to convey signalling to set up the conversational bearers over the CS domain. It will be understood that the requirement that conversational bearers should be set up over the CS domain may already be known to the SIP server (e.g. it could be a "property" defined for the subscriber), or the SIP server may be informed of the requirement by a visited network being used by the UE-A as its access network, avoiding the need for the SIP UA to explicitly signal this to the SIP server.

It is important from the point of view of network operating efficiency that the media gateway (MGw) selected for terminating the circuit switched call is located as close as possible to the RNC/BSS of the radio access network, i.e. within the service are of the controlling MSC, and that there should be only one physical MGw on the initiating side and only one physical MGw on the terminating side. This is the scenario illustrated in FIG. 4. The MSC, according to the current procedures, is the entity that selects the MGw which will terminate the circuit switched call. This selection is not carried out until the initiating terminal, in this case UE-A, initiates the CS call. It is therefore important that the S-CSCF partially anticipate the choice of MGw by selecting that MGCF which can control the same set of MGws that can be selected by the MSC (a single MGCF cannot control all of the MGws in the operator's network: typically a MGCF controls the same set of MGws as a single MSC). Were this not to be the case, with the S-CSCF selecting a MGCF not having control of the same MGw, another MGw would be introduced into the call path. In considering this problem, it is important to note that extensions to the CS domain protocols and architecture are not allowed, as the CS domain is already deployed. Extension to the IMS protocols and architecture are allowed, since it is not already deployed.

Figure 5:
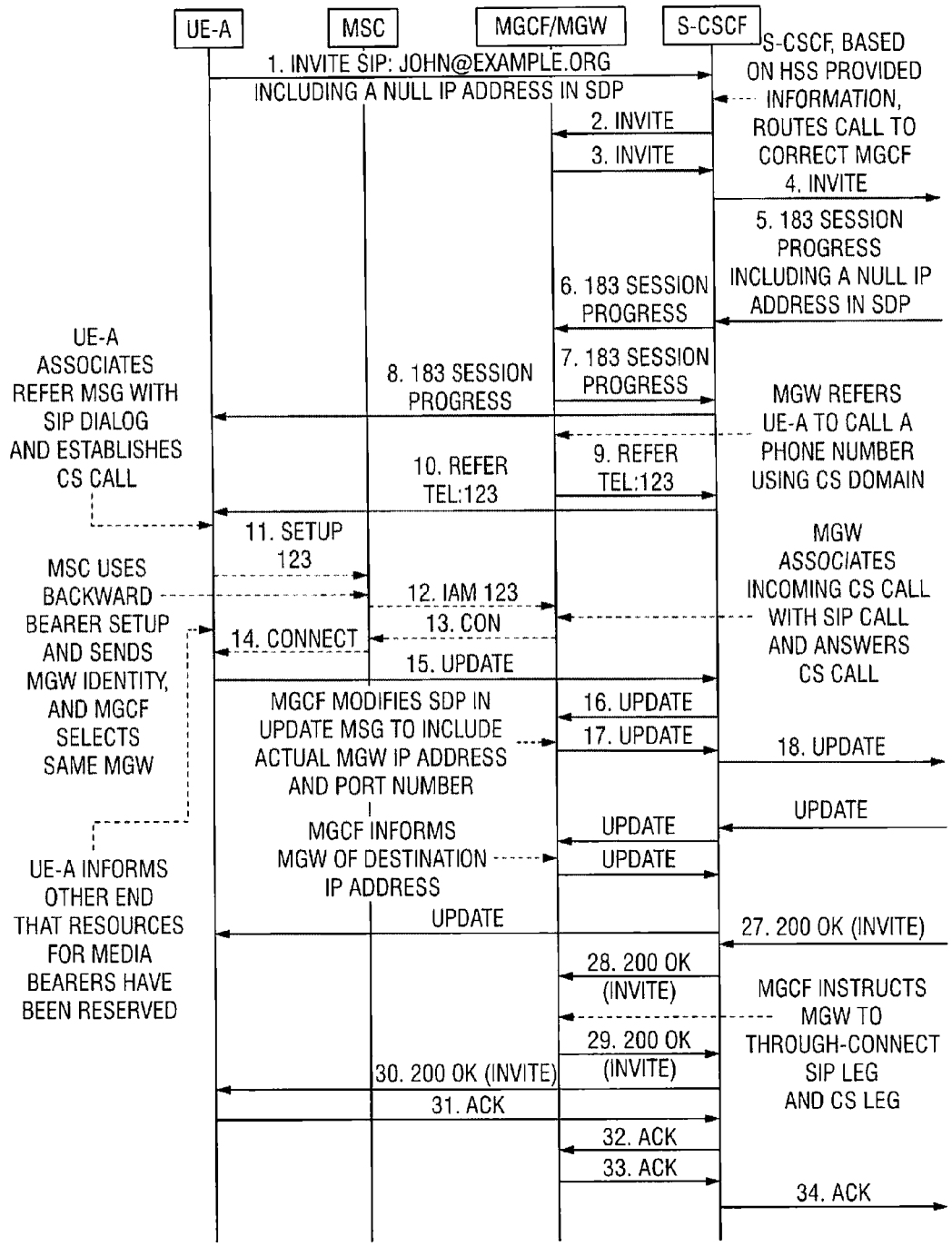
FIGS. 5 and 6 illustrate signaling associated with the setting up of a session, extending at least in part over a circuit switched network, using a packet switched network to carry the set-up signaling according to an embodiment of the present invention.
Figure 6:
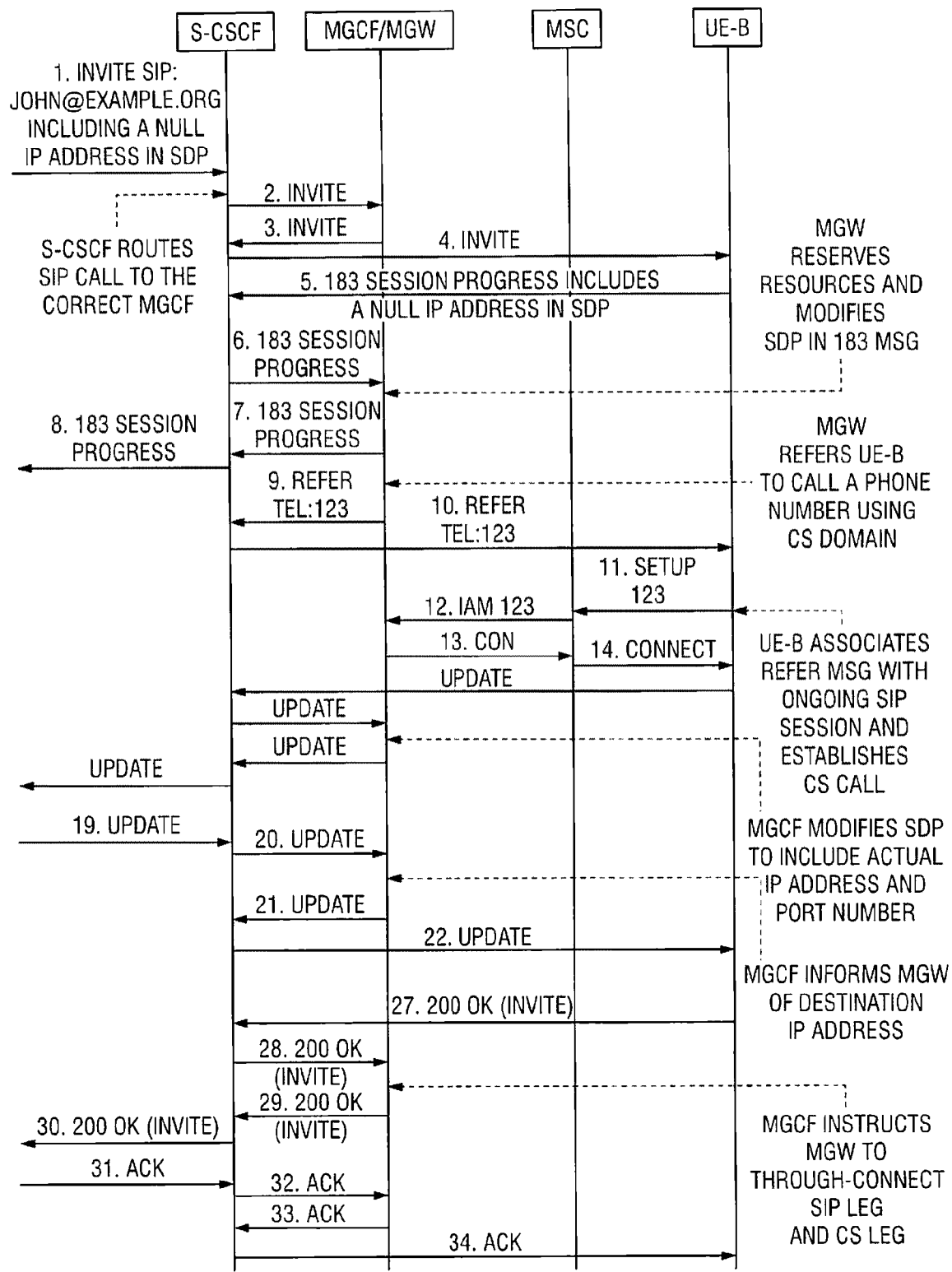

FIGS. 5 and 6 illustrate signalling associated with the setting up a CS call for carrying voice, video, etc (note that some irrelevant messages, such us the 200 OK answer for the SIP UPDATE request, are not shown in the sequences). This assumes that the initiating and terminating UEs have already registered with their respective home access networks and with their respective SIP networks. UE-A initiates the call set-up procedure by sending a SIP INVITE message to the responsible S-CSCF. This INVITE message contains the SIP address of the destination UE-B, in this case "sip: john@example.org", as well as an indication that the user is requesting the establishment of a voice call. The S-CSCF knows that, for this initiating subscriber, voice calls should be established over the CS network.

The S-CSCF must identify the MGCF which has responsibility for the MGw which will be selected by the MSC to terminate the CS call. There are two alternative means for achieving this:

a) Pull model: for every SIP INVITE request received at the S-CSCF, the S-CSCF queries the HSS to find out the identity of the serving MSC or the corresponding MGCF address. This solution has the drawback of adding new delays to the call setup and more reduces the capacity of the S-CSCF and HSS with extra queries.

b) Push model: at SIP registration time, the HSS sends to the S-CSCF the serving MSC identity or the corresponding MGCF address. Should there be a change in such serving MSC, the HSS will push the new serving MSC identity or the corresponding MGCF address to the S-CSCF. This is the preferred solution.

Once the MGCF is identified, the S-CSCF is able to route the SIP INVITE request to that MGCF.

The MGw at each side needs to know the destination address of the other MGw to which (voice) packets should be sent. This could be achieved by including in the SDP of the INVITE message the source IP address (to be used as the destination address by the receiving end). However, with the procedure described here, the source IP address (allocated to the initiating side MGw) will not be known (by the MGCF) until some time after the receipt of the INVITE at the S-CSCF. In order to avoid delaying the set-up process, the UE-A inserts a null IP address (0.0.0.0) into the SDP of the INVITE request, and UE-B inserts a null IP address (0.0.0.0) into the SDP of the SIP 183 response. The actual IP addresses to which media packets must be sent are exchanged later (SIP UPDATE request), once the MGw has been selected.

The MGCF responds to receipt of the INVITE message by reserving a telephone number for the CS call. This number is selected from a pool of numbers previously allocated to the MGCF. The MGCF sends a SIP REFER message to UE-A via the S-CSCF, referring the UE-A to call to a phone number identified in the message. Receipt of this message at UE-A automatically causes UE-A to place a call to the indicated number. Using the Bearer Independent Call Control (BICC) protocol (between MSC and MGCF) it is possible to do a backward bearer setup whereby the MSC selects the MGw prior to signalling to the MGCF. The MSC includes the MGw identity (BCU-Id) in the BICC IAM message. This allows the MGCF to select the same MGw as the MSC. The MGCF associates the incoming CS call with the SIP call, and answers the CS call, returning a CONNECT message to the UE-A. The MGCF reserves an IP termination from the MGw.

The initiating UE sends a SIP UPDATE message to the terminating UE following receipt of the CONNECT message. The MGCF modifies the SDP in the UPDATE message to include the actual MGw IP address and port number, before forwarding it to the destination UE via the terminating side MGCF. That MGCF identifies the destination IP address and informs the associated MGw. Upon receipt of the SIP 200 OK for INVITE from the terminating side UE, the terminating side MGCF instructs the associated MGw to through connect the SIP leg and the CS leg. The OK message is relayed to UE-A, with a SIP response being returned to UE-B. The users can then begin a voice conversation.

It will be appreciated that an analogous procedure is carried at out the terminating side, resulting in the MGCF at the initiating side being informed of the IP address of the MGw selected at the terminating side.

It will be appreciated by the person of skill in the art that various modifications may be made to the above description without departing from the scope of the present invention. In one such modification, the call-back number may be transferred from the MGCF to the UE-A in the SIP 183 Session Progress message. At the terminating end, the call-back number may be communicated to the UE-B in the INVITE to the terminating UE. This procedure does not require the use of REFER messages.

The invention claimed is:

1. A method of setting up a call between first and second nodes of a communication system, said call extending across a circuit switched access network available to the first node and a packet switched backbone network, the networks being interconnected by at least one Media Gateway, the method comprising:
   1) sending a call initiation message from the first node to the second node via a control node over a packet switched access network available to the first node;
   2) at the control node, obtaining from a Home Subscriber Server the identity of a Media Gateway Control Function controlling that Media Gateway which will terminate the circuit switched call for the first node;
   3) establishing a circuit switched call between the first node and said Media Gateway;
   4) sending from the control node to the first node over the packet switched access network, a circuit switched access number associated with the identified Media Gateway Control Function;
   5) calling said access number from the first node, and as part of the call set-up procedure communicating the identity of the Media Gateway selected to terminate the call to the Media Gateway Control Function;
   6) terminating the circuit switched call at the selected Media Gateway; and
   7) sending an update message from the first node to the second node over the packet switched access network, the Media Gateway Control Function incorporating into the update message an IP address of said selected Media Gateway.

2. The method according to claim 1, wherein a packet session is established utilizing the Session Initiation Protocol (SIP), and said control node is a Serving Call State Control Function node located within the IP Multimedia Subsystem.

3. The method according to claim 2, wherein said call initiation message is a SIP INVITE message.

4. The method according to claim 2, wherein said call initiation message is sent from the Serving Call State Control Function node to said second node via the Media Gateway Control Function, following identification of the Media Gateway Control Function by the Serving Call State Control Function.

5. The method according to claim 2, wherein said step of sending a circuit switched access number from the control node to said first node includes, following receipt of the call initiation message at the Media Gateway Control Function, sending from the Media Gateway Control Function to said first node, via the Serving Call State Control Function, a SIP message containing the access number.

6. The method according to claim 5, said step of calling said access number from the first node being carried out automatically at the first node following receipt at that node of the SIP message.

7. The method according to claim 5, wherein said SIP message containing the access number is a SIP REFER message.

8. The method according to claim 2, said update message being a SIP UPDATE message.

9. The method according to claim 1, wherein both the first and second nodes are attached to respective circuit switched and packet switched access networks, the method comprising carrying out steps 2) to 6) for the second node to establish a circuit switched call at the terminating side between the second node and a Media Gateway selected for that node, and carrying out step 7) to signal to the initiating side the IP address of that Media Gateway.

10. The method according to claim 1, wherein said second node has access to only a packet switched access network, and said Media Gateway exchanges packets directly with the second node.

11. The method according to claim 1, wherein one or both of the first and second nodes are user terminals.

12. The method according to claim 1, wherein said step of identifying a Media Gateway Control Function at the control node comprises receiving from a Home Subscriber Server either the identity of the switch to which the first node is currently attached or the identity of the Media Gateway Control Function associated with that switch.

13. The method according to claim 2, wherein the identity information is sent by the Home Subscriber Server automatically following SIP registration of the first node.

14. The method according to claim 1, wherein the communications system is a cellular radio communications system.

15. The method according to claim 14, wherein the identity is received in response to a query sent to the Home Subscriber Server by the control node, the query being triggered by receipt of the call initiation message.

16. The method according to claim 15, wherein the Home Subscriber Server receives Mobile Switching Centre location data for subscribers from a Home Location Register.

17. The method according to claim 14, wherein the setting up of the call to the Media Gateway is controlled by a Mobile Switching Centre, the Mobile Switching Centre sending an Initial Address Message to the Media Gateway Control Function and that message containing the identity of the selected Media Gateway.

18. A method of operating a Serving Call State Control Function of an IP Multimedia Subsystem to set up a call from a first client terminal to a second client terminal, the method comprising:
    receiving a SIP INVITE message from the first client terminal over a packet switched access network, the INVITE being identified as requiring the setting up of a circuit switched call from the first client terminal;
    forwarding the SIP INVITE message to a second client terminal;

sending a query to a Home Subscriber Server in order to identify a Media Gateway Control Function which controls that Media Gateway which will be selected to terminate the circuit switched call from the first client terminal;

sending a SIP REFER message from the Serving Call State Control Function to the first client terminal over the packet switched access network, said SIP REFER message including a circuit switched access number associated with the identified Media Gateway Control Function, which sets up the circuit switched call when the client terminal calls the circuit switched access number; and forwarding a SIP update message received from the first client terminal to the second client terminal over the packet switched access network, wherein the SIP update message includes an IP address of the selected Media Gateway incorporated into the SIP update message by the Media Gateway Control Function.

19. A method of operating a Media Gateway Control Function arranged to control a Media Gateway which provides a user plane interface between a circuit switched network and a packet switched backbone network, the method comprising:

receiving a SIP INVITE message from a first client terminal via a Serving Call State Control Function of an IP Multimedia Subsystem, wherein the SIP INVITE message is initiating a call from the first client terminal to a second client terminal;

in response to receipt of said SIP INVITE message, selecting a call back telephone number from a pool of numbers allocated to the Media Gateway Control Function;

sending the selected number to the first client terminal in a SIP message;

answering a subsequent call from the first client terminal to the selected number including receiving the identity of the Media Gateway which will terminate the circuit switched call for the first client terminal as part of the call set-up procedure;

incorporating into a SIP update message an IP address of the selected Media Gateway;

sending the SIP update message to the Serving Call State Control Function for forwarding to the second client terminal; and informing the Media Gateway of the IP address of the second client terminal.

20. A method of setting up a call between a first node and a second node in a communication system, wherein the first node has access to both a circuit switched access network and a packet switched access network, and the call is set up across the circuit switched access network and a packet switched backbone network, the networks being interconnected by an originating Media Gateway, the method comprising:

utilizing packet switched signaling to identify the originating Media Gateway and an originating Media Gateway Control Function controlling the originating Media Gateway and to provide a telephone number for the originating Media Gateway Control Function to the first node;

establishing a circuit switched call leg between the first node and the originating Media Gateway Control Function;

sending an IP address of the originating Media Gateway from the originating Media Gateway Control Function to the second node via a terminating Media Gateway Control Function;

establishing a packet switched call leg between the originating Media Gateway and the terminating Media Gateway; and through-connecting the call to the second node.

* * * * *